Sept. 20, 1966  A. BORZYM  3,273,433
TUBULAR STOCK CUTOFF METHOD AND APPARATUS
Filed Dec. 1, 1964  9 Sheets-Sheet 1

INVENTOR.
Alexander Borzym
BY
Harness, Dickey & Pierce
ATTORNEYS.

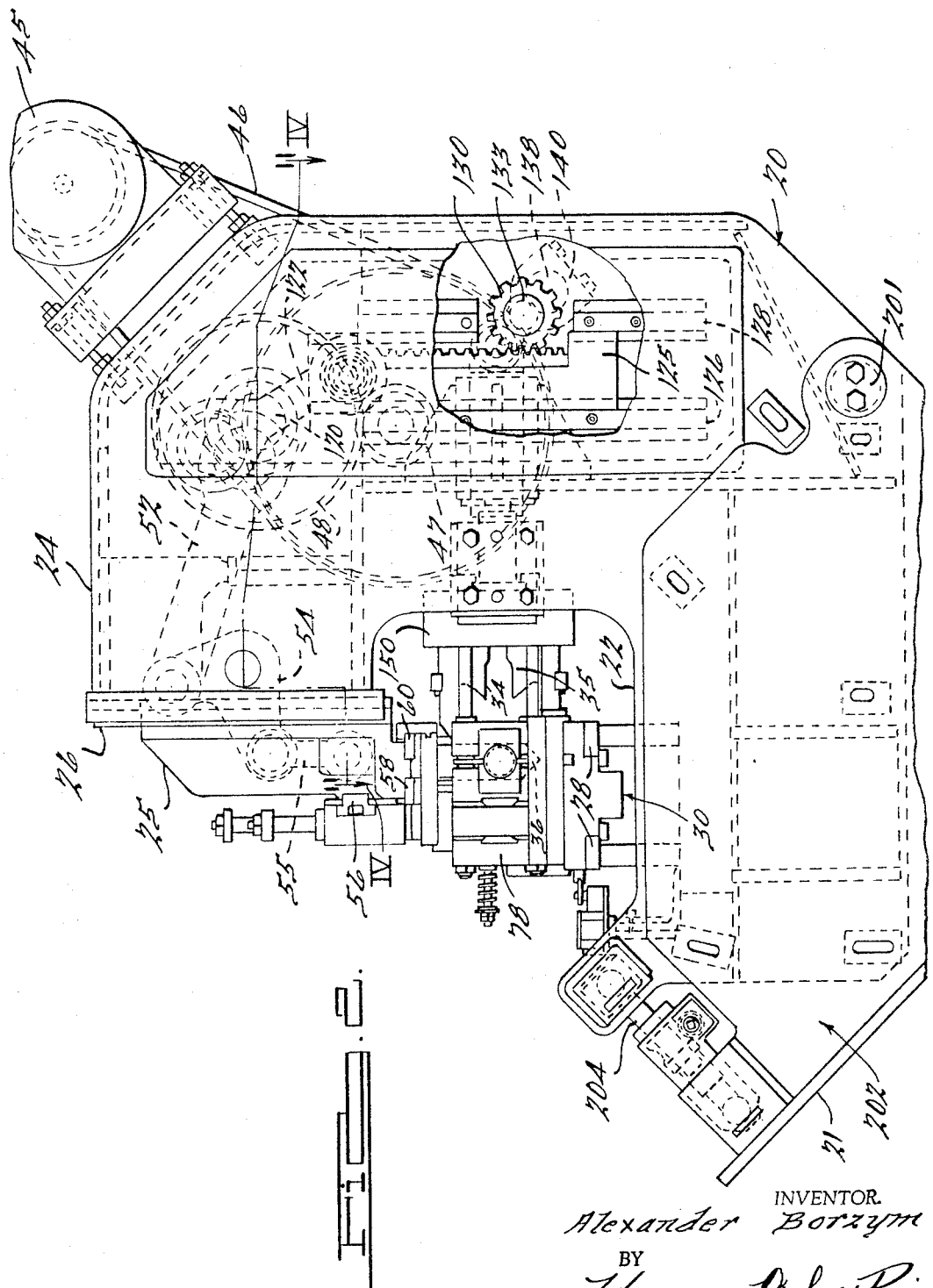

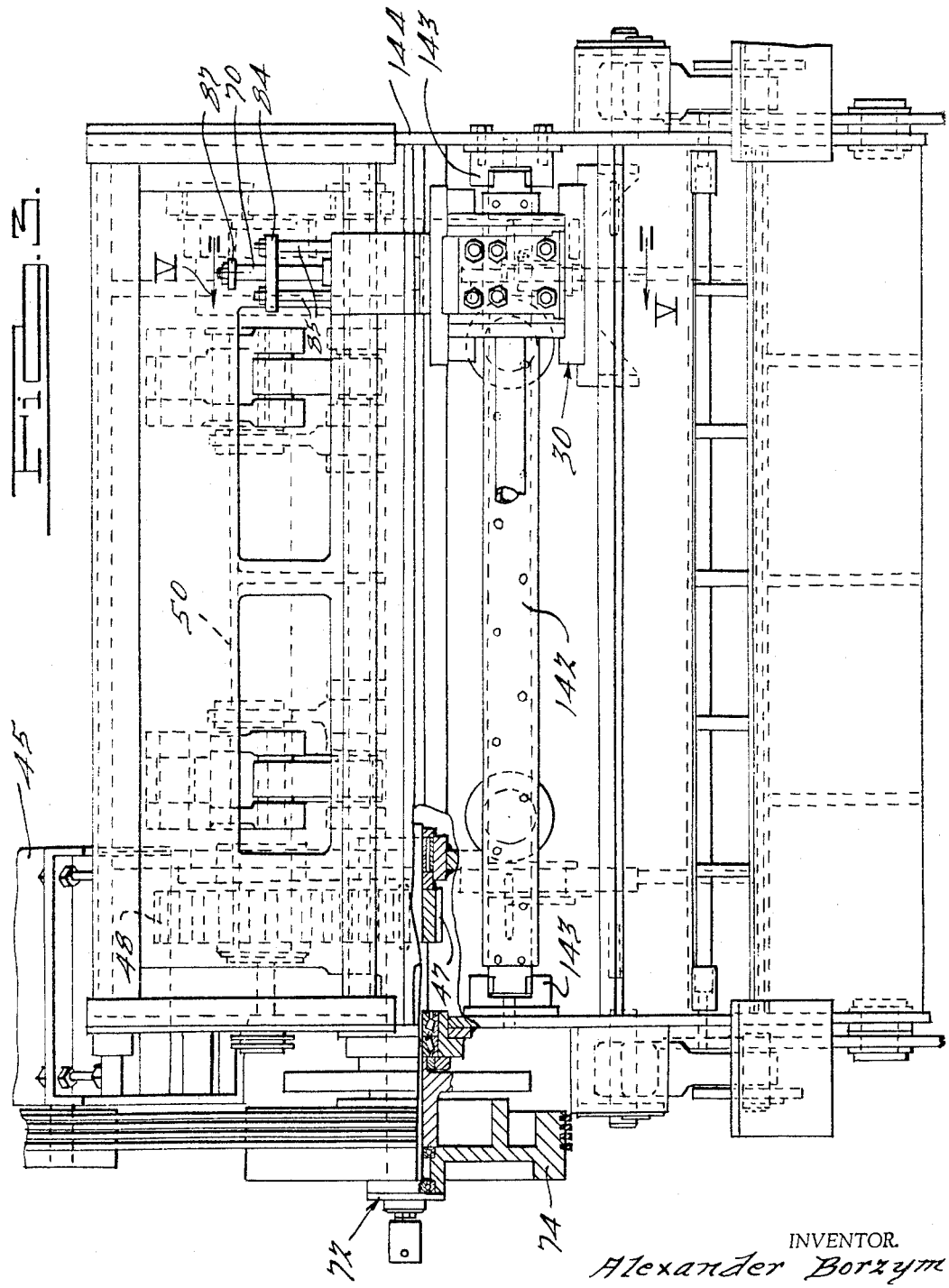

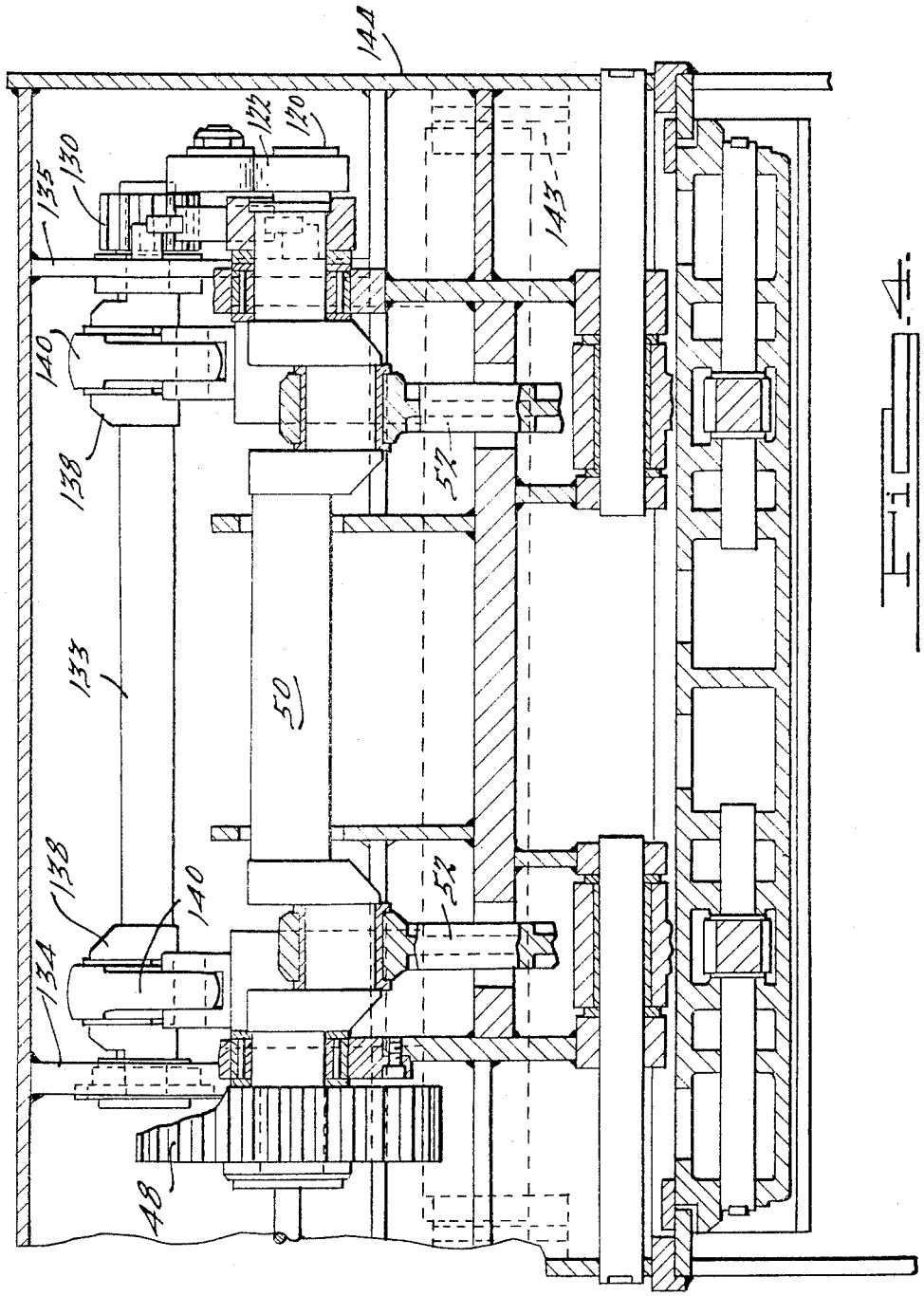

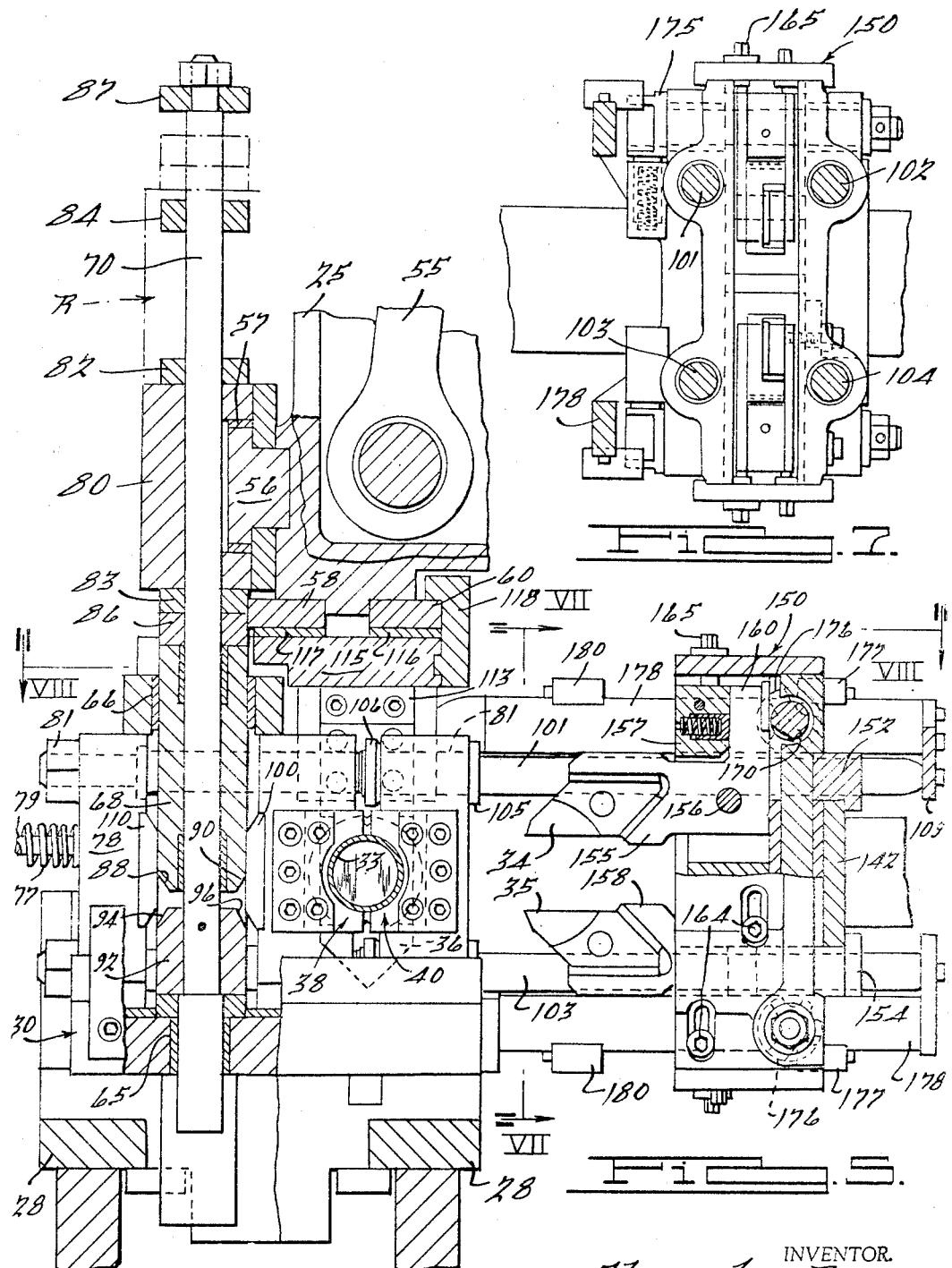

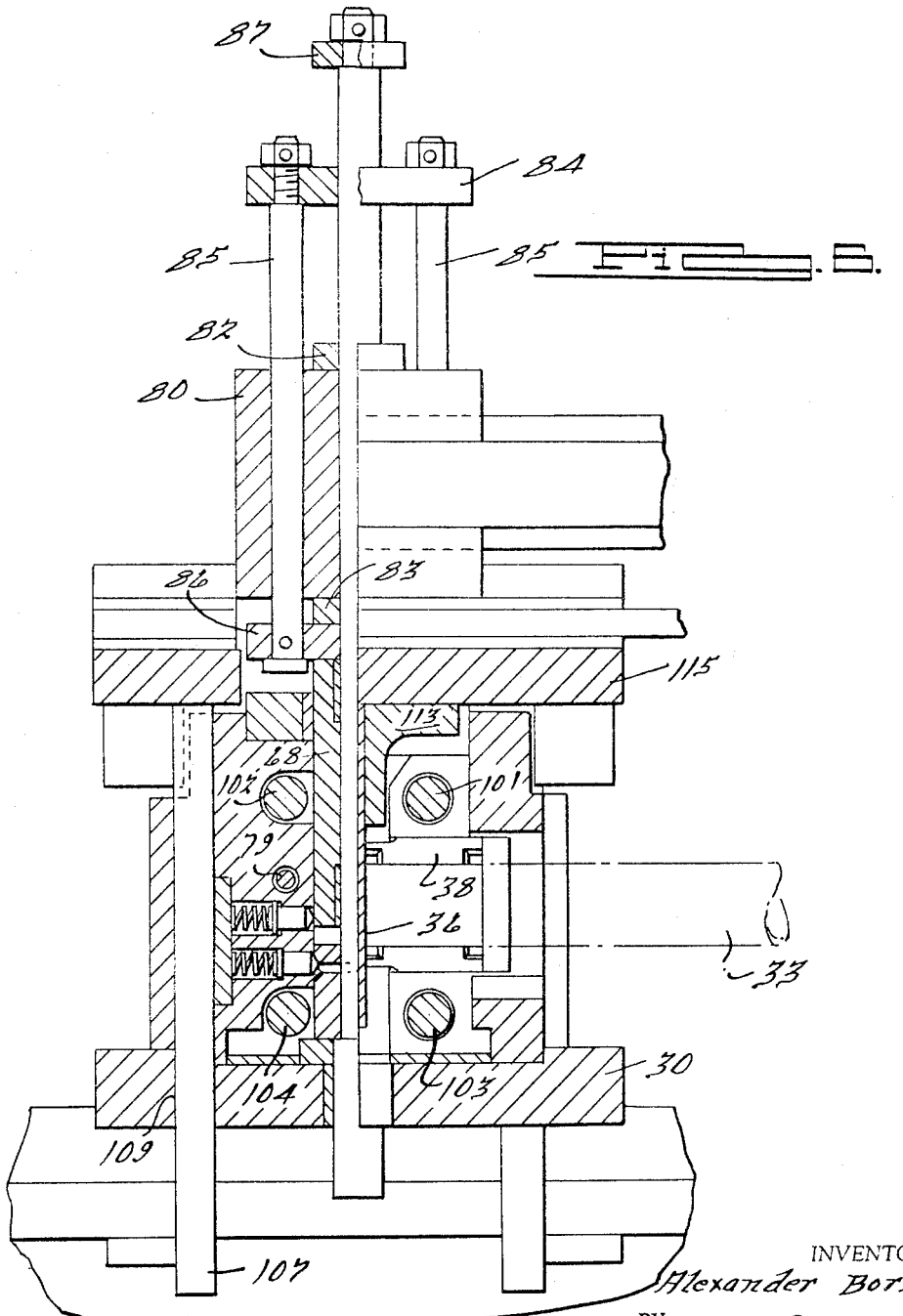

Sept. 20, 1966    A. BORZYM    3,273,433
TUBULAR STOCK CUTOFF METHOD AND APPARATUS
Filed Dec. 1, 1964    9 Sheets-Sheet 7
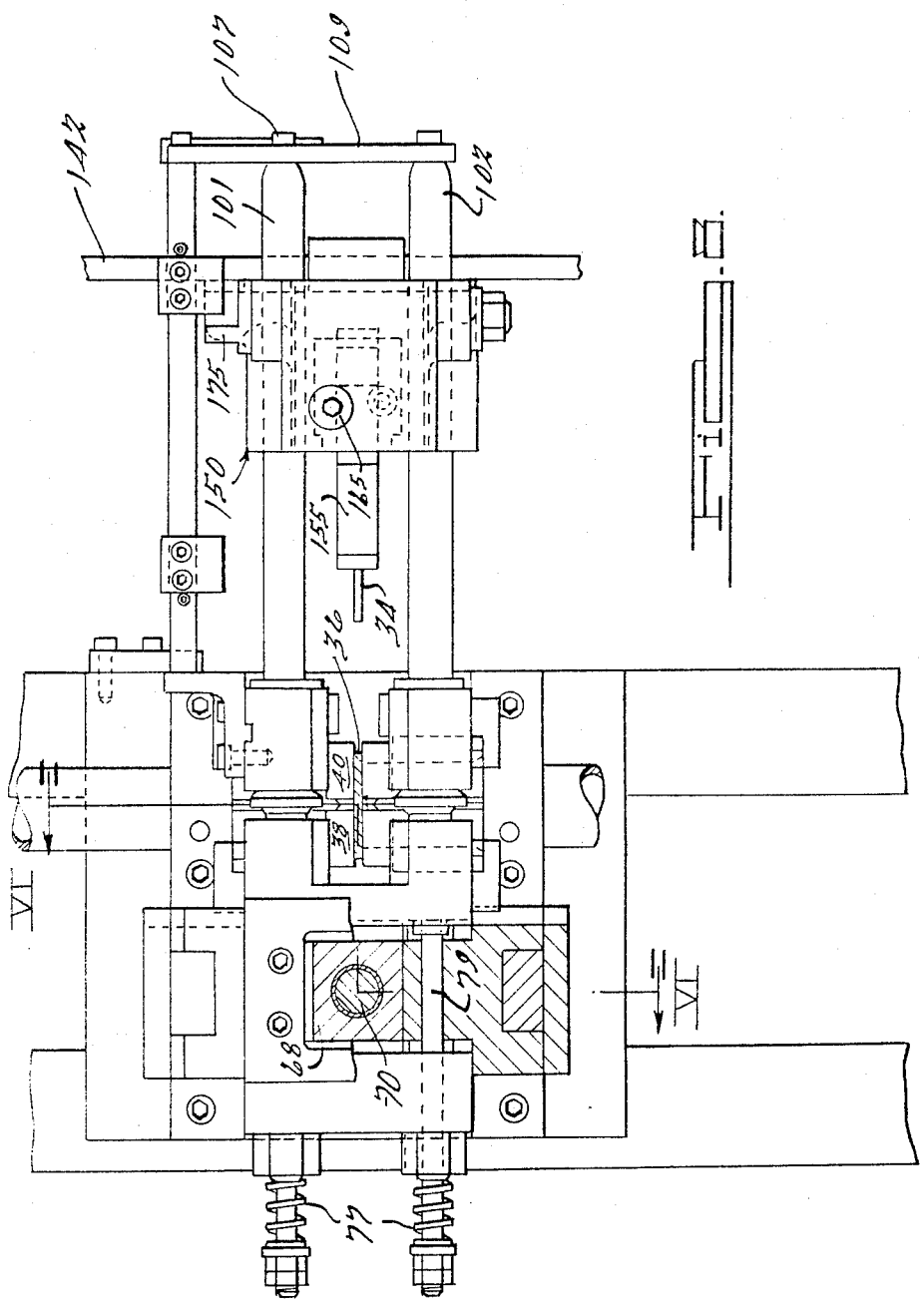
INVENTOR.
Alexander Borzym
BY
J. Carney, Dickey & Pierce
ATTORNEYS

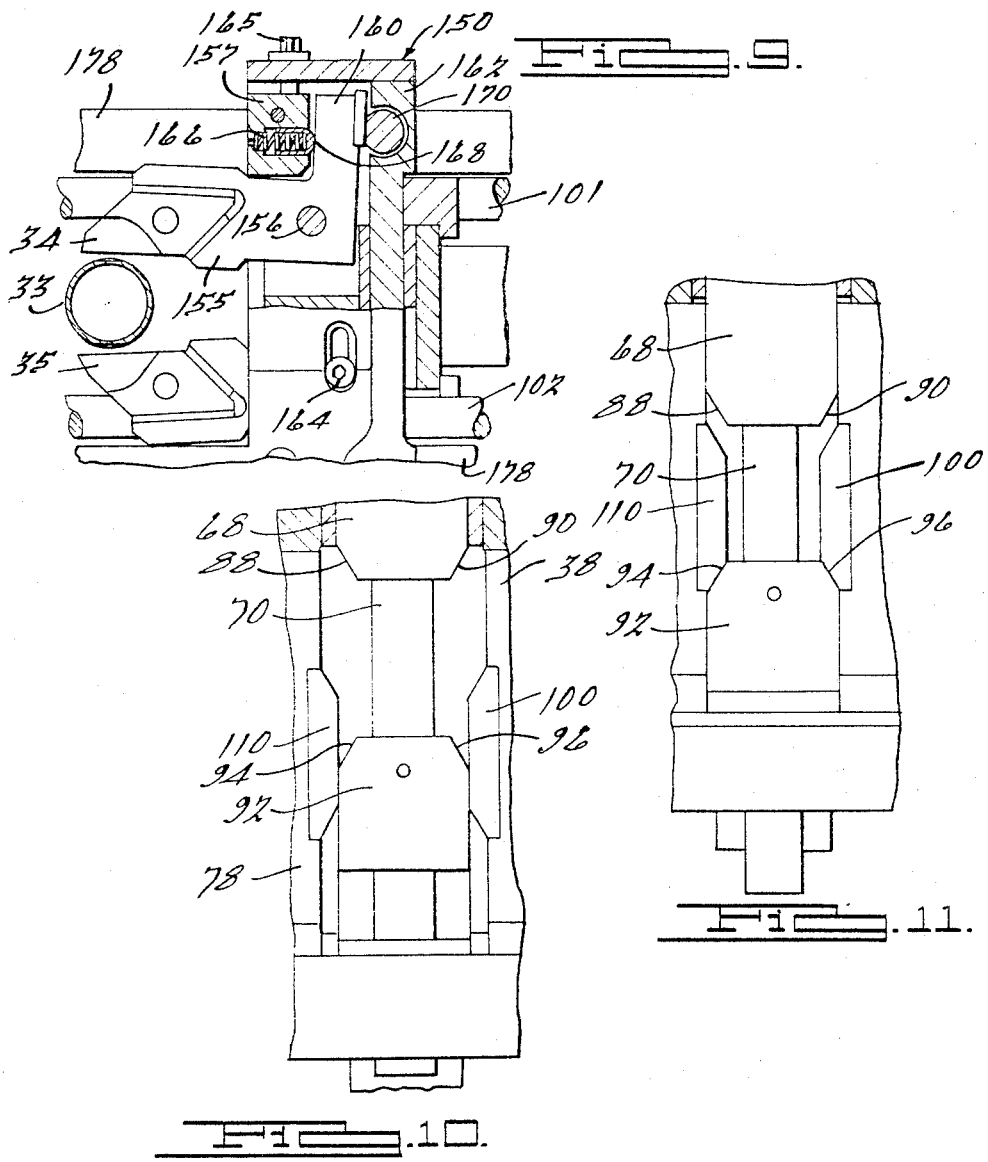

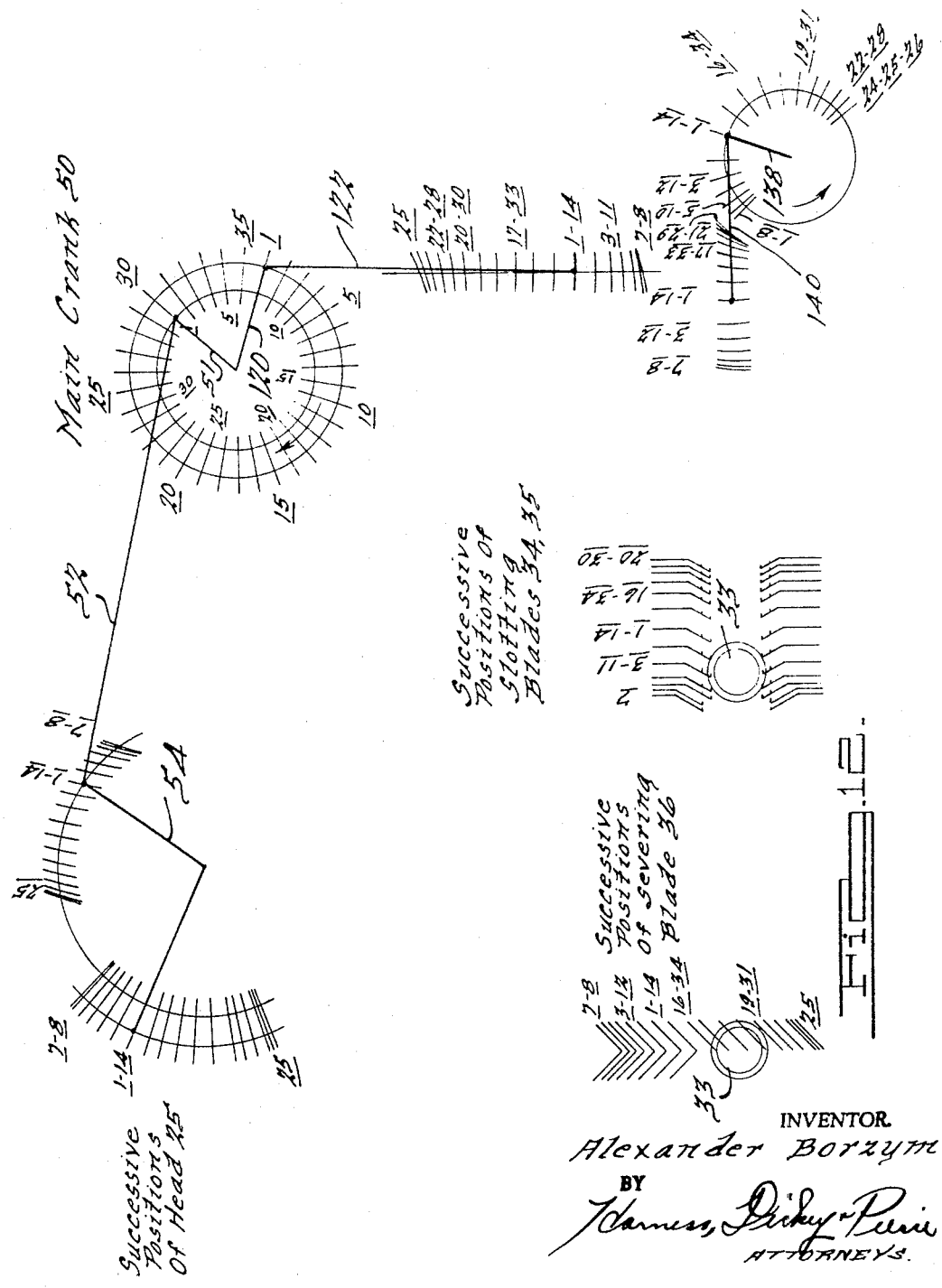

United States Patent Office 3,273,433
Patented Sept. 20, 1966

3,273,433
TUBULAR STOCK CUTOFF METHOD AND APPARATUS
Alexander Borzym, 6841 Oakman Blvd., Dearborn, Mich.
Filed Dec. 1, 1964, Ser. No. 415,067
10 Claims. (Cl. 83—54)

The present invention relates to an improved method and apparatus for cutting tubular stock rapidly and cleanly and is particularly adapted to high production cutoff of metal tubing.

An important object of the invention is to provide an improved flying cutoff method and apparatus which is capable of rapidly severing tubing of variant thicknesses, including thin-walled tubing, without materially distorting the cross sectional shape of the tubing, and which leaves the severed ends smooth and free of burrs.

Another object is the provision of a method and apparatus for severing metal tubing employing cutoff blades in an improved manner which greatly increases the effective life of the blades.

Other objects and advantages will become apparent upon consideration of the present disclosures in its entirety.

In the drawing:

FIGURE 2 is a side elevational view, partly broken away, with the press structure upright;

FIGURE 3 is a front elevational view of the press with the carriage omitted, partly broken away;

FIGURE 4 is a sectional plan view taken substantially on the line IV—IV of FIGURE 2 and looking in the direction of the arrows;

FIGURE 5 is a vertical sectional elevational view partially broken away, taken substantially on the line V—V of FIGURE 3 and looking in the direction of the arrows, the parts being shown on a somewhat larger scale;

FIGURE 6 is a vertical sectional view taken substantially on the line VI—VI of FIGURE 8 and looking in the direction of the arrows, a portion of the ram being omitted;

FIGURES 7 and 8 are sectional views taken substantially on the lines VII—VII, and VIII—VIII, respectively, of FIGURE 5, and looking in the direction of the arrows;

FIGURE 9 is a sectional elevational view of certain slotting blade parts and associated actuating components viewed in the same direction as FIGURE 5 but with the blades in a different position;

FIGURES 10 and 11 are vertical sectional elevational views of certain of the actuating components for the chuck jaws, showing the same in gripping and released positions, respectively, and FIGURE 12 is a diagram indicating the relative positioning of the principal components at successive phases of one complete cycle of operation of the machine, the slotting blade positioning being offset.

Figure 1:
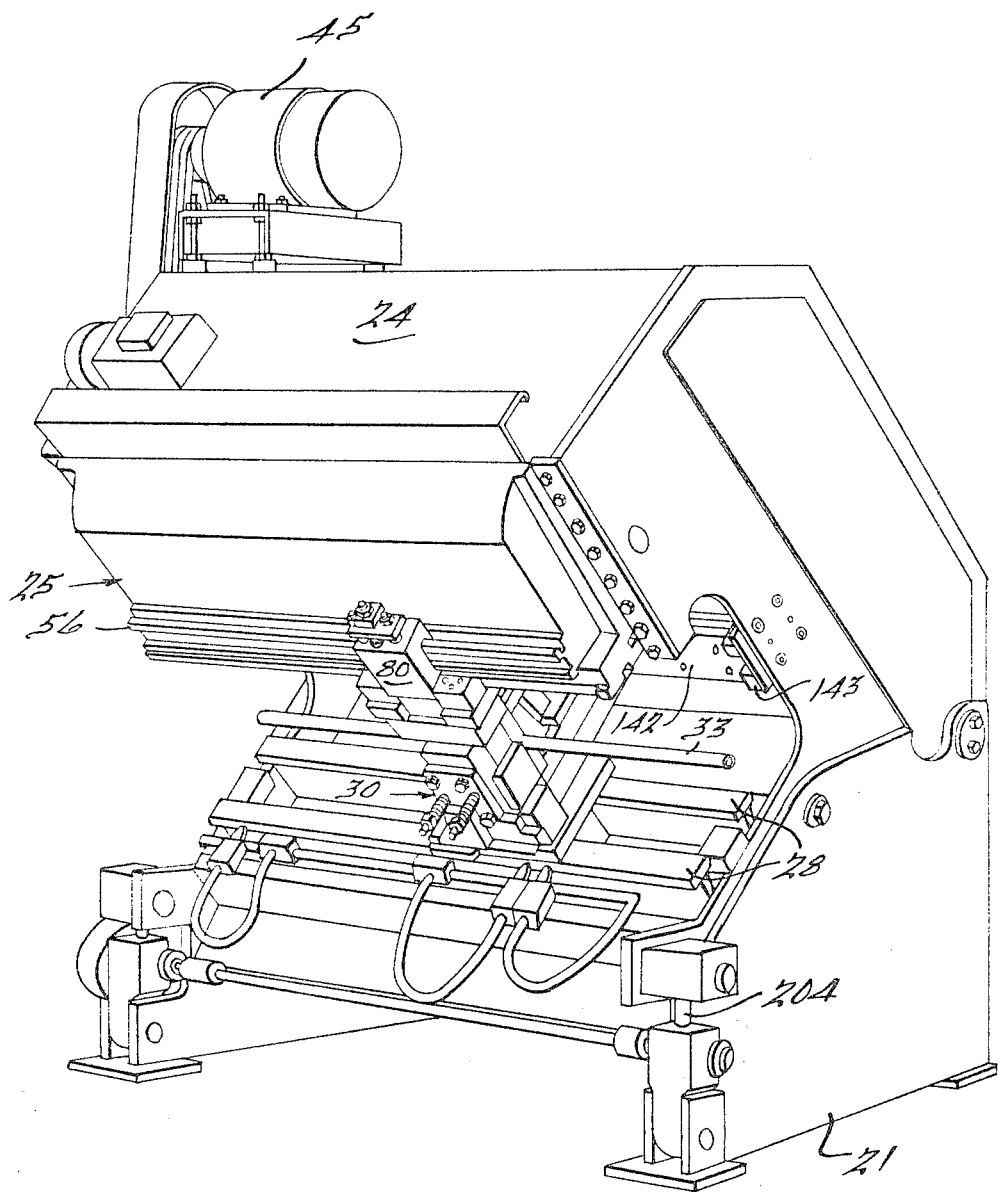
FIGURE 1 is a perspective view of a cutoff machine incorporating my invention, showing the press structure tilted forwardly.

Referring now to the drawings, the machine of my present invention is of the general type disclosed in my prior Patent Re. 22,114, dated June 16, 1942. Two sets of cutters are employed, one set comprising a pair of slotting blades which first engage the work to form transversely aligned slots in opposite sides of the wall of the tubing. The second set comprises a single, flat, piercing or severing blade, lying in the plane of the slots and movable, in such plane, in a direction perpendicular to the slots. The last mentioned blade is pointed in such manner as to enter one of the previously formed slots in the stock and is projected entirely through the tube in the slotted area to sever the tube. The two sets of blades are supported in a carriage which is movable with the axial travel of the tubing which is being severed, the blade being actuatable in the manner previously described, to sever the tubular work, without interrupting movement of the work.

While the press construction and the actuating mechanism may be varied in detailed structural features, a preferred press illustrated comprises essentially a frame 20 of generally C-form and including a bed portion 22 and a head portion 24 spaced above the bed and carrying a ram 25 reciprocable toward and from the bed in ways 26. Stationary rails 28 on the bed slidably support a carriage 30 movable on rails 28 beneath the ram 25. The work, exemplified by the thin-walled metal tube illustrated at 33, is presumed to travel continuously in an axial direction and may be emanating, for example, from tube forming means of the extrusion or seam welding type.

In addition to the aforementioned cutter blades and associated actuating parts, the carriage is provided with releasable chuck jaws adapted to grip the tubing and rigidly position it and the carriage with relation to each other during the cutting operation. The upper and lower slotting blades are respectively generally designated 34 and 35, the severing blade is generally designated 36, and the two chuck jaw assemblies are respectively designated 38, 40. The ram 25 of the press is powered by a suitable source such as the electric motor 45. The motor drives the ram 25 through power transmitting means comprising belting 46 and gearing 47–48, which rotate crankshaft 50. The crankshaft is connected by connecting rod 52, bellcrank 54, and pitman 55 to the ram 25.

Although in the description of the preferred press-type machine herein disclosed the words "vertical" and "horizontal" have been used, the relative nature of these terms will be understood. Preferably the entire machine is tiltable approximately 45° forwardly, so as to rest on the surface designated 21 in FIGURE 2 which is the position in which machine is shown in FIGURE 1 and which is desirable where tubing of square rather than round section is to be severed, because of the orientation in which square tubing is customarily discharged from the mill, as will be recognized. In addition, the main frame 20 is pivoted at 201 in a supporting cradle frame 202 (an angular front portion of which defines the alternative base surface 21 previously mentioned), the pivot axis at 201 being near the rear and parallel to the work. Jack screw assemblies 204 adjustably connect the main frame 20 and cradle frame 202 at the front. Operation of jack screws 204 moves the entire press structure about the axis at 201, thereby enabling changing the line of travel of the chuck jaw assemblies, in their longitudinal travel with carriage 30, to suit different diameters of work. The gripping portions of the chuck jaws are, of course substitutable for different work sizes and contours. Such features of adjustment, being well known in the art, will not require detailed exposition.

The ram 25 carries on its front face near the bottom a laterally elongated T-shaped rail 56, and at its bottom carries two parallel rails 58–60, lying in a common horizontal plane, all of the rails 56, 58, 60 being parallel to the axis of the work and to the travel of carriage 30, and all being rigidly attached to the ram 25.

Vertical movement of the ram 25 actuates the chuck jaw assemblies 38–40 and the severing blade 36. Separate driving means presently to be described, but powered from the same motor 45, is provided for the slotting cutters 34, 35.

FIGURES 2, 5 and 6 show the parts in the positions they occupy at the bottom of the stroke of the ram, which corresponds to completion of the cutoff operation, but before the parts have returned to the initial rest position in which they dwell between cycles. Carriage 30 supports by means of suitable slide bearings 65, 66, a rod 70 which is limitedly vertically movable with the ram 25 (slide bearing 66 supports the independently slidable chuck actuating wedge-cam 68, the action of which will be described hereafter, while wedge-cam 68 in turn slidably supports rod 70).

In its initial position, the ram 25 is intermediate the top and bottom of its stroke, corresponding to the position shown in dotted lines and designated R in FIGURE 5. In such initial position, the chuck is released, carriage 30 is at the right in FIGURES 1, 3 and 4, and in normal operation the tubing would then be moving freely through the released jaws 38, 40 toward a position at which a cut is required. When the tubing reaches such position representing a desired length, it initiates press action by suitable trip means (such means it not illustrated, forming no part of my present invention and being well known in the art). The trip means is effective to engage a pneumatic clutch or other suitable driving means, generally designated 72 which may be housed in the main drive pulley 74 of the press, as is also well known. As best shown in FIGURE 3, the pulley 74, when clutch 72 is engaged, is effective to drive pinion 47 which in turn through gear 48 actuates the main crankshaft 50. The same trip means is effective to initiate actuation of the carriage 30 to move it with the work, by the energization of suitable carriage actuating means (not shown). Such carriage actuating means powered by air and/or hydraulic cylinder and piston elements are well known in the art and form no part of my present invention. Such means accelerates the carriage to the speed of the work in the interval before the chuck jaws close, and the carriage travels with the work during the cutoff operation, whereafter the carriage is returned by its actuating means prior to commencement of the next cutoff cycle.

The direction of rotation of the crankshaft 50 is such that the initial movement of the head 25 is upwardly from its initial position. In such initial position the chuck jaws 38, 40 are open, as noted above, chuck jaw 38 being then urged to the left, and jaw 40 to the right, as viewed in FIGURES 5 and 8, by compression springs 77 which bear to the left on rods 79 attached to chuck jaw assembly 38 and to the right against laterally shiftable plate 78 which is attached to the forward ends of rods 101, 102, 103, 104. Rods 101, 102, 103 and 104 are attached to jaw assembly 40 and are slidably mounted in end project rearwardly from carriage 30. The sliding travel of rods 101, 102, 103, 104 is limited to the required travel of jaw assembly 40, and these rods form a slidable support for the slotting carriage 150, as will be more particularly referred to hereafter. At their rear ends rods 101, 102, 103, 104 are provided with pilot portions 107 slidably fitted in apertures (undesignated) in rear frame plate 109. Plate 109 forms a rigid extension of carriage 30, to the forward portions of which plate 109 is connected by rigid side rails 178.

Rail 56 on ram 25 is slidably interengaged with a longitudinal T-slot 57 in a follower block 80 which travels with carriage 30. Thus the block 80 may slide on the rail with movements of carriage 30, and the block, which is slidable on the rod 70, is also actuatable vertically by the ram. In the initial position, a hardened striker plate 82 secured to the top of block 80 lies close to an abutment plate 84 and during the initial movement, which is in an upward direction, engages abutment plate 84. Plate 84 is movable independently of rod 70, being carried by spaced parallel bars 85 supported for independent vertical sliding movement in block 80. At their lower ends bars 85 are attached to a plate 86 which is attached to chuck-actuating wedge 68. Plate 84, bars 85, plate 86 and wedge 68 thus constitute an assembly which is independently slidable. A hardened striker plate 83 is secured to the bottom of block 80 for engagement with abutment plate 86. Another abutment plate 87 is secured to the top of rod 70. Wedge 68 is of square cross section and is provided with inclined lower front and rear flat cam faces 88, 90. Secured to the rod 70 below the cam wedge 68 is a second cam wedge 92 having at its upper end inclined camming surfaces 94, 96 arranged oppositely to the camming surfaces 88, 90. A camming plate 100 having similarly inclined upper and lower camming surfaces is secured to the front face of chuck jaw assembly 38, the jaw assembly 38 being laterally slidable with rods 101, 102, 103, 104 which are limitedly slidable in the carriage structure 30, as previously noted.

The jaw assembly 40 is rigidly positioned between abutment flanges 105 on the rods 101–104 and coacting nuts 106 threaded on the rods, while jaw assembly 38 is slidably fitted on the rods. The plate 78 is rigidly secured to the front ends of rods 101, 102, 103, 104 by nuts 81.

Plate 78 carries on its rear face a cam plate 110 similar to, and located upon the opposite side of the wedging cams 68, 92 from the cam plate 100. When plates 100, 110 are forced apart by wedge cams 68 and/or 92, the jaws are thereby forced together to clamp the work. When both wedge cams are free of plates 100, 110, the jaws are moved apart by springs 77 to free the work.

In the initial position, the bottom wedging cam 92 lies close to but free of the lower ends of the cam plates 100, 110, wedging cam 68 being above and free of the cam plates 100, 110, as shown in FIGURE 11 of the drawing. The upward movement of the ram lifts wedging cam 92, by causing block 80, acting through the striker and abutment plates 82–84–87 to lift rod 70. Camming surfaces 94–96 then urge the jaws together in the manner described to rigidly hold the work with respect to carriage structure. Thereafter the rod 70 and wedging cam 92 remain elevated in the position shown in FIGURE 9, holding the chuck closed, while the ram completes its upward movement and during the downward movement of the ram until the follower block 80 has moved downwardly with respect to rod 70 to a position where its lower striker plate 83 strikes abutment plate 86. Plate 86 then forces wedging cam 68 downwardly toward wedging cam 92, without thereby moving the rod 70 or displacing wedging cam 92 until wedging cam 68 strikes wedging cam 92 and pushes it downwardly, together with rod 70. During such simultaneous unitary movement of wedging cams 68, 92, however, the chuck remains closed, because the cam plates 100, 110 are longer in their vertical dimension than the vertical spacing then existing between the camming surfaces of the two wedging cams. The chuck accordingly remains closed while the ram continues all of its downward movement, and also during that portion of its subsequent upward movement which occurs prior to engagement and lifting of plate 84 sufficiently to pull the upper wedging cam 68 free of cam plates 100, 110. As the ram completes the final portion of its upward movement to the initial position, it pulls cam 68 free, the chuck disengages, and the press is simultaneously declutched so that the ram remains stationary until another cut is called for by the trip means.

The severing blade 36 moves as a unit with the ram 25, blade 36 being attached by means of a holder 113 to a plate having a horizontal slide bearing portion 116 on its upper surface which engages the bottoms of the head rails 58, 60 so that the blade is driven downwardly by downward movement of the ram of the press. The plate 115 is also provided with a slide portion 118 which overengages the rail 60 to lift the severing blade during upward movement of the ram. Vertically slidable bars 107 secured to plate 115 extend slidably downwardly through guideways 109 in carriage 30.

Crankshaft 50 is provided upon its end farther from drive gear 48 with a crank 120 to which is journaled a connecting rod 122. At its lower extremity connecting rod 122 is pivotally connected to and serves to vertically reciprocate a rack 125 slidable in ways 126, 128. The rack drives a gear 130 fast upon a crankshaft 133, also journaled in the frame of the press. As shown in FIGURES 3 and 4, crankshafts 50 and 133 are supported in suitable bearings in webs as 134, 135 secured as by welding in and forming part of the frame of the press. Throws 138 of crankshaft 133 actuate connecting rods 140, the other ends of connecting rods 140 being pivotally connected to the rear of a platelike rail 142 arranged in a vertical plane and extending parallel to the work and movable in a horizontal plane toward and from the work by rotation of the crankshaft. Plate 142 is supported and guided at its ends in gibs 143 secured to the inner side walls 144 of the press. Such movement of the plate 142 actuates the slotting blades 34, 35, which are mounted in a slotting carriage structure generally designated 150 which is in turn slidably mounted on the bars 101, 102, 103, 104. Attached to the carriage 150 are ways 152, 154 slidably over-engaging the upper and lower edges of the driving plate 142, so that carriage 150 may move along plate 142 with movements of the main carriage 30 in the direction of work travel.

The upper slotting cutter blade 34 is attached to a holder 155 in the form of a bellcrank pivoted in carriage 150 upon a pin 156 parallel to the axis of the work. The lower jaw 35 is similarly pivotally supported in a symmetrically oppositely disposed and rockable holder 158. The holders 155, 158 and their pivot pins 156 are mounted in supporting blocks 157 adjustably movable toward and away from each other but normally rigidly positioned. The blade holders are rockable about their supporting pins from the operative position shown in FIGURE 5 in which they are parallel to one another and spaced properly to slot the tube wall, to a spread-apart position, illustrated in FIGURE 9, wherein the cutters move in a path entirely clear of the work. Description of one of the slotting blades and its mode of actuation will suffice for both. The outwardly projecting arm 160 of the bellcrank, integral with the holder arm portion 155, extends between a rigid back wall portion 162 of the carriage 150 and block 157, these parts being spaced apart a distance exceeding the width of bellcrank arm 160 sufficiently to permit the arm and cutter to rock to the two positions indicated. The blocks 157 are adjustably secured in position as by adjusting screws 165 extending through the top and bottom of the carriage 150 and clamping screws 164 extending through the sides of the carriage, so that spacing of the slotting blades can be accurately adjusted to both to accommodate different tube sizes and to adjust the depth of the slot. The setting is preferably such that the slotting blades do not cut entirely through the tube wall. The arm 160 is urged in a direction to move the cutter away from the work by means of a spring 166 and poppet 168 housed in the block 162. A cam 170 rotatably supported in the frame of the carriage 150 is engageable with the rear face of bellcrank arm 160. As shown, cam 170 may be formed as a cylindrical portion having a flattened area corresponding to a position of retraction of the blades, so that only when the cam is turned to the position wherein such flat area abuts the arm 160 can the blade move to the retracting position under the influence of the spring 166. Rotation of cam 170 and the corresponding cam for lower blade 35 to positions which bring cylindrical portions of the cams to bear against the backs of the bellcrank arms moves the blades inwardly to and locks them in the cutting position illustrated in FIGURE 5.

Shaft portions constituting an extension of each of the cams corresponding to cam 170 project from one side of the carriage 150. Each such shaft carries fast upon its projecting end a trip cam 175. A lobe 176 on each trip cam is so positioned that as the carriage 150 completes its rearward movement, lobes 176 strike abutments 177 carried by rails 178 which lie beside and parallel to the path of travel of cams 175. The cams 175 and connected cams 170 are thereby rocked to the positioning indicated in FIGURE 5 which locks the bellcranks and thereby the jaws 34, 35 in their operative positions. As the carriage 150 moves forwardly to cause the cutters, 34, 35 to perform the slotting operation, the cams 170 hold the blades in such operative position until completion of the slotting operation. During a final overtravel portion of the forward movement, which occurs after the slotting is completed, lobes 176 strike forward abutments 180 which rock the cams back to the position shown in FIGURE 9 and the blades 34, 35 are thereby moved apart by the springs 166 so that upon rearward movement of the carriage, the cutters are entirely free of and are not dragged across the work.

The pinion 130 and the travel of rack 125 are so proportioned that crankshaft 133 only oscillates through approximately 180° during each vertical stroke of the rack, and the angular arrangement of the crank throws 120, 138, as shown, is such that in the initial or rest position of the press, the slotting carriage 150 lies quite far forward, with the slotting blades close to but free of the work and is ready to start rapid forward slotting movement as the ram starts its upward movement and then rapidly retract before the ram has moved downwardly far enough to cause the severing blade 36 to interfere with the slotting blades. It will be noted that the path of rack 125, although straight, is not radial to the journal axis of crankshaft 50, and that the path of sliding movement of slotting jaws 34, 35 is not radial to the journal axis of crankshaft 133, and that this offsetting increases the rate of initial linear travel of the slotting carriage.

In FIGURE 12, which is believed self-explanatory, the underlined numbers bear no relation to the reference characters used hereinbefore, and will be recognized as designating sequential positionings of the several components to which they are applied, the designation 1 denoting the dwell position in which the parts stand between cutting cycles, 2 designating the second plotted position, etc. throughout the sequence. The sequential plottings of slotting blade positioning is offset to the right for clarity of illustration. It will be noted that the slotting blades have returned to entirely non-obstructing positions (13 and 14) before the severing blade has descended to positions close to the work.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a cutoff machine including means for positioning tubular work on a predetermined axis, a pair of slotting blades movable in parallel paths transversely of and on opposite sides of said axis, a severing blade lying in the same plane as the slotting blades, the novelty which comprises means for moving the slotting blades in said paths in one direction in a spaced relationship which exceeds the inside diameter but is less than the outside diameter of tubing to be severed, means for increasing the spacing between said slotting blades to a distance exceeding the outside diameter of such tubing, and for subsequently retracting said slotting blades along said paths, and means for thereafter moving the severing blade across said axis in the same plane as but perpendicularly to the paths of the slotting blades.

2. In a cutoff machine including means for positioning tubular work on a predetermined axis, a pair of slotting blades movable in parallel paths transversely of and on opposite sides of said axis, and a severing blade lying in the same plane as the slotting blades, blade actuating means comprising a crank, a rack reciprocable by rotation of the crank, a gear driven by said rack, and a second crank driven by the gear.

3. In combination with means as defined in claim 2, means for guiding the rack in a rectilinear path, such path being non-radial to the journal of the first-mentioned crank.

4. A machine as defined in claim 3 wherein said means for positioning the work includes a jaw movable to and from clamping engagement with the outside of the work, said slotting blades being drivable by the rack and the jaw and severing blade being actuatable by the first-mentioned crank independently of the rack.

5. A machine as defined in claim 3 wherein said slotting blades are drivable by the rack and the severing blade is actuatable by the first-mentioned crank independently of the rack.

6. In a cutoff machine including means for positioning tubular work on a predetermined axis, a pair of slotting blades movable in parallel paths transversely of and on opposite sides of said axis, a severing blade lying in the same plane as the slotting blades, the novelty which comprises means for moving the slotting blades in said paths in one direction in a spaced relationship which exceeds the inside diameter but is less than the outside diameter of tubing to be severed, means for increasing the spacing between said slotting blades to a distance exceeding the outside diameter of such tubing, and for subsequently retracting said slotting blades along said paths, means for thereafter moving the severing blade across said axis in the same plane as but perpendicularly to the paths of the slotting blades, blade-actuating means comprising a crank, a rack reciprocable by the crank in a rectilinear path non-radial to the journal of the crank, a gear driven by the crank, and a second crank driven by the gear, said slotting blades being driven by the second crank and the severing blade being driven by the first-mentioned crank independently of the rack.

7. In a cutoff machine including means for positioning tubular work on a predetermined axis, a pair of slotting blades movable in parallel paths transversely of and on opposite sides of said axis, a severing blade lying in the same plane as the slotting blades, the novelty which comprises means for moving the slotting blades in said paths in one direction in a spaced relationship which exceeds the inside diameter but is less than the outside diameter of tubing to be severed, means for increasing the spacing between said slotting blades to a distance exceeding the outside diameter of such tubing, and for subsequently retracting said slotting blades along said paths, means for thereafter moving the severing blade across said axis in the same plane as but perpendicularly to the paths of the slotting blades, blade-actuating means comprising a crank, a rack reciprocable by the crank in a rectilinear path non-radial to the journal of the crank, a gear driven by the crank, and a second crank driven by the gear, said slotting blades being driven by the second crank and the severing blade being driven by the first-mentioned crank independently of the rack, the paths of the slotting blades being non-radial to the journal of the second crank.

8. In a cutoff machine including means for positioning tubular work on a predetermined axis, a pair of slotting blades movable in parallel paths transversely of and on opposite sides of said axis, a severing blade lying in the same plane as the slotting blades, the novelty which comprises means for moving the slotting blades in said paths in one direction in a spaced relationship which exceeds the inside diameter but is less than the outside diameter of tubing to be severed, means for increasing the spacing between said slotting blades to a distance exceeding the outside diameter of such tubing, and for subsequently retracting said slotting blades along said paths, means for thereafter moving the severing blade across said axis in the same plane as but perpendicularly to the paths of the slotting blades, blade-actuating means comprising a crank, a rack reciprocable by the crank in a rectilinear path non-radial to the journal of the crank, a gear driven by the crank, a second crank driven by the gear, said slotting blades being driven by the second crank and the severing blade being driven by the first-mentioned crank independently of the rack, said means for positioning the work including a jaw movable to and from clamping engagement with the work, said jaw also being driven by the first-mentioned crank independently of the rack.

9. In a cutoff machine including means for positioning tubular work on a predetermined axis, a pair of slotting blades movable in parallel paths transversely of and on opposite sides of said axis, a severing blade lying in the same plane as the slotting blades, the novelty which comprises means for moving the slotting blades in said paths in one direction in a spaced relationship which exceeds the inside diameter but is less than the outside diameter of tubing to be severed, means for increasing the spacing between said slotting blades to a distance exceeding the outside diameter of such tubing, and for subsequently retracting said slotting blades along said paths, means for thereafter moving the severing blade across said axis in the same plane as but perpendicularly to the paths of the slotting blades, blade-actuating means comprising a crank, a rack reciprocable by the crank in a rectilinear path non-radial to the journal of the crank, a gear driven by the crank, a second crank driven by the gear, said slotting blades being driven by the second crank and the severing blade being driven by the first-mentioned crank independently of the rack, said means for positioning the work including a jaw movable to and from clamping engagement with the work, said jaw also being driven by the first-mentioned crank independently of the rack, the paths of the slotting blades being non-radial to the journal of the second crank.

10. The method of severing tubular stock which comprises advancing a pair of slotting blades simultaneously in parallel path across and in contact with the opposite sides of the wall of the stock in a common plane transverse to the stock, to form slots in opposite sides of the stock, moving said blades apart within said plane to a spacing exceeding the outside diameter of the stock and then retracting the blades along said paths, and thereafter severing the stock by means of a blade projected through one of the slots and across the stock and through the other slot.

References Cited by the Examiner

UNITED STATES PATENTS

| | | | |
|---|---|---|---|
| Re. 22,114 | 6/1942 | Borzym | 83—54 |
| 2,243,614 | 5/1941 | Vogel. | |
| 2,572,137 | 10/1951 | Grieder | 83—210 |
| 3,129,624 | 4/1964 | Aver | 83—622 |
| 3,143,018 | 8/1964 | Everett | 83—54 |

WILLIAM W. DYER, JR., *Primary Examiner.*

L. B. TAYLOR, *Assistant Examiner.*

UNITED STATES PATENT OFFICE
CERTIFICATE OF CORRECTION

Patent No. 3,273,433　　　　　　　　　　　　　　September 20, 1966

Alexander Borzym

It is hereby certified that error appears in the above numbered patent requiring correction and that the said Letters Patent should read as corrected below.

Column 3, line 8, after "initial" insert -- rest --; line 47, for "end" read -- and --.

Signed and sealed this 22nd day of August 1967.

(SEAL)
Attest:

ERNEST W. SWIDER　　　　　　　　　　　　　　EDWARD J. BRENNER
Attesting Officer　　　　　　　　　　　　　　　Commissioner of Patents